1,678,446

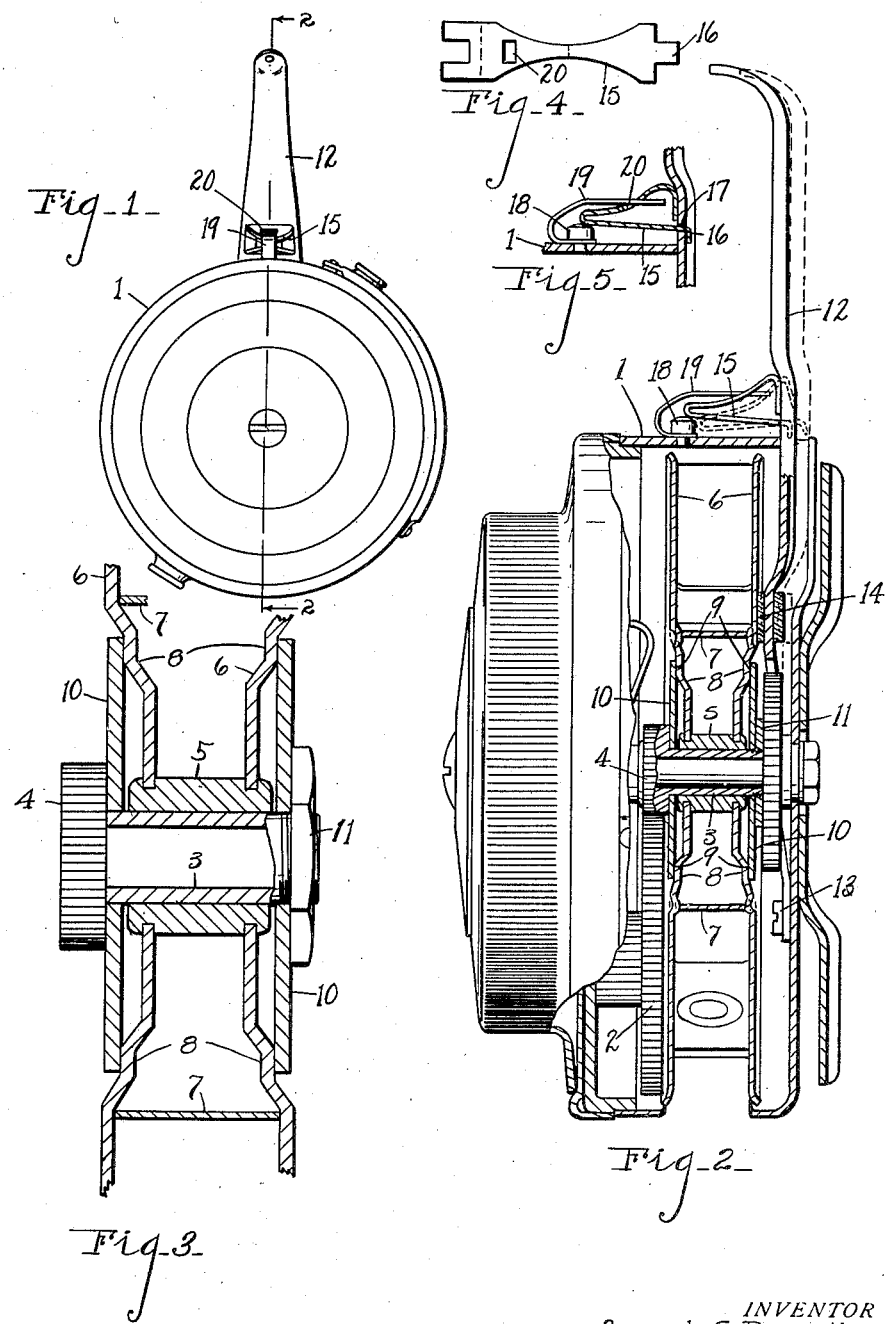
July 24, 1928.
S. G. RUSSELL ET AL
FISHING REEL
Filed Sept. 25, 1926
INVENTOR
Samuel G. Russell
Peter Workman Patented July 24, 1928.

UNITED STATES PATENT OFFICE.

SAMUEL G. RUSSELL AND PETER WORKMAN, JR., OF KALAMAZOO, MICHIGAN, ASSIGNORS TO SHAKESPEARE COMPANY, OF KALAMAZOO, MICHIGAN.

FISHING REEL.

Application filed September 25, 1926. Serial No. 137,790.

Our improvements are especially designed for embodiment in fishing reels of the spring wind type shown in the United States patent to Russell No. 1,510,904, dated September 7, 1924, and we have illustrated the same as embodied in such structure, although our improvements are capable of embodiment in certain other types of reels.

The main object of the invention is to provide in a fishing reel an improved friction driving spool structure and friction driving connection therefor to its spindle.

Objects pertaining to details will definitely appear from the detailed description to follow. The invention is defined in the claims.

A structure embodying the features of our invention is illustrated in the accompanying drawing, forming a part of this application, in which:

Fig. 1 is a top view of a spring wind reel embodying the features of our invention.

Fig. 2 is an enlarged fragmentary view partially in section on line 2—2 of Fig. 1.

Fig. 3 is an enlarged detail section of a structural detail of the spool.

Fig. 4 is a plan view of the blank from which the brake locking dog is formed.

Fig. 5 is a cross-sectional view of the brake locking dog and spring.

Referring to the drawing, 1 represents the casing generally and 2 a spring-driven gear. Inasmuch as the details of the driving means form no part of this invention and suitable means are illustrated in the said patent to Russell, we have not illustrated or described the same in detail herein.

The spool spindle 3 is provided with a pinion 4 which meshes with the gear 2, this pinion being formed as a part of or fixed to the spindle. The spool comprises a hub 5 rotatable on this spindle, spool flanges 6 fixed to the hub and a barrel 7 secured between the flanges, the line being wound upon this barrel. The flanges have stepped inward offsets 8 providing annular friction surfaces 9 with which the friction driving disks 10 coact. These driving disks are arranged on the spindle, one of them being supported by the pinion 4 and the other by the nut 11. The disks are fixed to the spindle so that they rotate therewith, the disks engaging the spool flanges with sufficient friction to drive the same with the spindle under ordinary conditions, allowing it to rotate, however, under undue stresses. The friction is adjusted so that the spool will rotate independently of the spindle when the load exceeds a predetermined amount.

The brake lever 12 is secured to the casing at 13 and provided with a shoe 14 adapted to engage the side of the spool, the brake lever engaging with sufficient friction to hold the spool against rotation under the action of the spring. The brake lever is held out of engagement by means of the latch or dog 15 which is mounted upon the lever by inserting the tongues 16 through the openings 17 in the lever, permitting swinging movement into and out of engagement with the keeper 18. The keeper 18, being in the form of a stud, also serves to secure the spring 19 which acts to hold the dog in engaging position, the tension of the spring, however, being sufficient to release the dog when engaged with the keeper. The spring is U-shaped, it being secured by the keeper engaging one arm, its free arm being arranged through a hole 20 in the latch. The outer end of the latch engages the inner side of the brake lever, thereby limiting the outward movement of the latch. This arrangement of spring with its free end through the opening in the latch serves as a line guard; that is, the line cannot be engaged with the latch.

Our improved spool is economical in its parts and the parts are readily assembled. The structure has the further advantage of being compact and very strong and durable.

Having thus described our invention what we claim as new and desire to secure by Letters Patent is:

1. In a structure of the class described, the combination of a spindle threaded at one end, a pinion fixed to the opposite end of said spindle, a spool comprising a hub rotatable on said spindle, flanges having stepped inwardly offset central portions fixed to said hub, the said stepped offsets providing annular friction surfaces, a barrel mounted between said flanges concentrically of said hub, friction disks arranged on said spindle at the ends of said hub to coact with the said friction surfaces of said flanges, one of said friction disks being supported by said pinion, and a nut threaded upon said spindle to support the other friction disk.

2. In a structure of the class described, the combination of a spindle threaded at one end, a pinion fixed to the opposite end of said spindle, a spool comprising a hub rotatable on said spindle, flanges fixed to said hub, a barrel mounted between said flanges concentrically of said hub, friction disks arranged on said spindle at the ends of said hub to coact with said flanges, one of said friction disks being supported by said pinion, and a nut threaded upon said spindle to support the other friction disk.

3. In a structure of the class described, the combination with a casing, a spool, driving means for said spool, a brake lever operatively associated with said spool to project at one side of said casing, a loop-like latch tiltingly mounted on said lever and having an opening in the outer arm thereof, a keeper on said casing coacting with said latch, and a U-shaped spring secured to said casing with one arm and having its other arm disposed through said opening in said latch, coacting for the purpose specified.

4. In a structure of the class described, the combination of a casing, a spool, a brake lever operatively associated with said spool and projecting at the side of the casing, a latch mounted on said lever for holding the same in disengaging position, and a releasing spring for said latch arranged to constitute a line guard, preventing engagement of the line with the latch.

5. In a structure of the class described, the combination of a driving spindle, a spool comprising a hub rotatable on said spindle, flanges having stepped inwardly offset central portions fixed to said hub, said stepped offsets providing annular friction surfaces substantially spaced from the hub, resilient friction driving discs arranged on said spindle at the end of said hub with portions adjacent their peripheries coacting with said annular friction surfaces providing a driving friction connection for the spindle to the spool, and a barrel mounted between said flanges concentrically of said hub and adjacent said friction surfaces, said barrel constituting a thrust supporting member for said flanges.

6. In a structure of the class described, the combination of a driving spindle, a spool comprising stepped inwardly offset central portions fixed to said hub, said stepped offsets providing annular resilient friction surfaces substantially spaced from the hub, and friction driving discs arranged on said spindle at the end of said hub with portions adjacent their peripheries coacting with said annular friction surfaces providing a driving friction connection for the spindle to the spool.

In witness whereof we have hereunto set our hands.

SAMUEL G. RUSSELL.
PETER WORKMAN, Jr.